(12) United States Patent
Li et al.

(10) Patent No.: US 10,690,832 B2
(45) Date of Patent: Jun. 23, 2020

(54) LIQUID CRYSTAL DISPLAY PANEL, DISPLAY DEVICE AND DRIVING METHOD FOR THE SAME

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN); Wei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 39 days.

(21) Appl. No.: 15/759,493

(22) PCT Filed: Sep. 21, 2017

(86) PCT No.: PCT/CN2017/102560
§ 371 (c)(1),
(2) Date: Mar. 12, 2018

(87) PCT Pub. No.: WO2018/129950
PCT Pub. Date: Jul. 19, 2018

(65) Prior Publication Data
US 2019/0129082 A1    May 2, 2019

(30) Foreign Application Priority Data

Jan. 12, 2017    (CN) .......................... 2017 1 0023213

(51) Int. Cl.
*F21V 8/00* (2006.01)
*G02F 1/137* (2006.01)
(Continued)

(52) U.S. Cl.
CPC ............. *G02B 6/005* (2013.01); *G02F 1/137* (2013.01); *G02F 1/13306* (2013.01);
(Continued)

(58) Field of Classification Search
CPC ..... G02B 6/005; G02F 1/13306; G02F 1/137; G02F 1/133512; G02F 1/134309;
(Continued)

(56) References Cited

U.S. PATENT DOCUMENTS

2012/0092590 A1\* 4/2012 Shestak ............. G02F 1/133504
349/62
2015/0234221 A1 8/2015 Anderson et al.
(Continued)

FOREIGN PATENT DOCUMENTS

CN    101419340 A    4/2009
CN    105572984 A    5/2016
(Continued)

OTHER PUBLICATIONS

Office Action received for Chinese Patent Application No. 201710023213.X, dated Mar. 28, 2019, 23 pages (13 pages of English Translation and 10 pages of Office Action).
(Continued)

*Primary Examiner* — Nathanael R Briggs
*Assistant Examiner* — William D Peterson
(74) *Attorney, Agent, or Firm* — Womble Bond Dickinson (US) LLP (57) ABSTRACT

The present disclosure relates to the field of display technology, and provides a liquid crystal display panel, a display device, and a driving method for the same. The liquid crystal display panel includes an array of pixel units, wherein each pixel unit includes a plurality of sub-pixel units. The liquid crystal display panel further includes: a first substrate, a second substrate, a liquid crystal layer, a pixel electrode layer, a common electrode layer, and a waveguide grating which are stacked over each other.

20 Claims, 3 Drawing Sheets

(51) Int. Cl.
*G02F 1/1335* (2006.01)
*G02F 1/1343* (2006.01)
*G02F 1/133* (2006.01)
*G02F 1/13357* (2006.01)

(52) U.S. Cl.
CPC .. *G02F 1/133512* (2013.01); *G02F 1/133615* (2013.01); *G02F 1/134309* (2013.01); *G02F 1/133514* (2013.01); *G02F 2001/133565* (2013.01); *G02F 2201/123* (2013.01); *G02F 2201/302* (2013.01); *G02F 2201/305* (2013.01); *G02F 2203/30* (2013.01); *G02F 2203/34* (2013.01)

(58) Field of Classification Search
CPC ......... G02F 1/133615; G02F 1/133514; G02F 2201/123; G02F 2201/302; G02F 2201/305; G02F 2203/30; G02F 2203/34; G02F 2001/133565
USPC .......................................................... 349/33
See application file for complete search history.

(56) References Cited

U.S. PATENT DOCUMENTS

2018/0088438 A1  3/2018  Wang et al.
2018/0107059 A1  4/2018  Zhao et al.

FOREIGN PATENT DOCUMENTS

| CN | 105589256 A |   | 5/2016 |           |
|----|-------------|---|--------|-----------|
| CN | 106292049 A |   | 1/2017 |           |
| CN | 106292051 A | * | 1/2017 | G02F 1/1326 |
| CN | 106292051 A |   | 1/2017 |           |
| CN | 106324898 A |   | 1/2017 |           |
| CN | 106681047 A |   | 5/2017 |           |
| WO | 2014/081415 A1 |   | 5/2014 |           |

OTHER PUBLICATIONS

International Search Report received for PCT Patent Application No. PCT/CN2017/102560, dated Dec. 27, 2017, 8 pages (3 pages of English Translation and 5 pages of Original Document).

* cited by examiner

LIQUID CRYSTAL DISPLAY PANEL, DISPLAY DEVICE AND DRIVING METHOD FOR THE SAME

CROSS REFERENCE TO RELATED APPLICATIONS

The present application is the U.S. national phase entry of PCT/CN2017/102560, with an international filling date of Sep. 21, 2017, which claims the priority of the Chinese patent application No. 201710023213.X filed on Jan. 12, 2017, disclosures of which is both are incorporated herein in its entirety by reference.

FIELD

The present disclosure relates to the field of display technology, and in particular, to a liquid crystal display panel, a display device and a driving method for the same.

BACKGROUND

In the current display market, Liquid Crystal Displays (LCDs) and Organic Light Emitting Diode (OLED) display devices occupy a dominant position.

With the continuous progress of display technology and users' constant requirements for display, as a novel display technique, waveguide gratings have become a hot spot of attention recently in the display field due to its advantages, such as higher resolution, higher light utilization, faster response speed, and good display effect.

SUMMARY

Embodiments of the present disclosure provide a liquid crystal display panel, a display device and a driving method for the same, to eliminate or at least alleviate one or more of the existing drawbacks.

According to an embodiment of the present disclosure, there is provided a liquid crystal display panel. The liquid crystal display panel comprises an array of pixel units, wherein each pixel unit comprises a plurality of sub-pixel units. Besides, the liquid crystal display panel further comprises: a first substrate and a second substrate opposite to each other; a liquid crystal layer as well as a pixel electrode layer and a common electrode layer for driving the liquid crystal layer between the first substrate and the second substrate; and a waveguide grating between the liquid crystal layer and the first substrate. Specifically, the waveguide grating comprises a waveguide layer and a grating layer on a surface of the waveguide layer facing the liquid crystal layer, wherein the grating layer is in contact with the liquid crystal layer. Further, in the liquid crystal display panel, the pixel electrode layer further comprises an array of pixel sub-electrodes insulated from each other, wherein each sub-pixel unit corresponds to a plurality of pixel sub-electrodes. Also, the grating layer further comprises an array of grating units, wherein each grating unit comprises a plurality of grating sub-units, and each grating sub-unit corresponds to a pixel sub-electrode. In addition, the refractive index of each grating sub-unit is further configured such that light is not allowed to be transmitted through a corresponding portion of liquid crystal when a first voltage is applied to a respective pixel sub-electrode, and light is allowed to be transmitted through a corresponding portion of liquid crystal with a predetermined grayscale when a second voltage is applied to a respective pixel sub-electrode, wherein the second voltage is different from the first voltage.

Further, in a specific embodiment of the liquid crystal display panel, the plurality of sub-pixel units further comprise a first primary color of sub-pixel, a second primary color of sub-pixel, and a third primary color of sub-pixel. In such a case, the grating units further comprise a first grating unit corresponding to the first primary color of sub-pixel, a second grating unit corresponding to the second primary color of sub-pixel, and a third grating unit corresponding to the third primary color of sub-pixel.

Further, in each grating unit of the liquid crystal display panel, the plurality of grating sub-units differ from each other at least in one or more of the following aspects: the duty cycle, the height of a grating bar in a direction perpendicular to the display panel, the cross-section shape of the grating bar in a plane parallel to the display panel, as well as the length and the width of a grating area in a direction parallel to the side of the display panel.

Further, in a specific embodiment of the liquid crystal display panel, each grating unit comprises eight grating sub-units corresponding to eight pixel sub-electrodes respectively. Further, refractive indexes of the eight grating sub-units are configured respectively such that light is allowed to be transmitted through corresponding portions of liquid crystal with 1-level, 2-level, 4-level, 8-level, 16-level, 32-level, 64-level and 128-level grayscale when the second voltage is applied to respective pixel sub-electrodes.

Further, in an embodiment, the eight grating sub-units are arranged in a form of one row and eight columns, eight rows and one column, four rows and two columns, or two rows and four columns.

Further, in a specific embodiment of the liquid crystal display panel, the refractive index of each grating sub-unit is configured to be identical to the refractive index of a corresponding portion of liquid crystal when the first voltage or the second voltage is applied to a respective pixel sub-electrode.

Further, in a specific embodiment of the liquid crystal display panel, the first voltage or the second voltage is set to be zero voltage. This means that the corresponding portion of liquid crystal will have an initial refractive index when the zero voltage is applied to the respective pixel sub-electrode.

Further, according to an embodiment of the present disclosure, the liquid crystal display panel further comprises a color film layer between the liquid crystal layer and the second substrate, wherein the color film layer comprises an array of color film patterns, and each color film pattern corresponds to a sub-pixel unit. Specifically, in an optional embodiment, the color film layer comprises a first primary color of pattern, a second primary color of pattern and a third primary color of pattern, wherein the first primary color of pattern corresponds to the first primary color of sub-pixel, the second primary color of pattern corresponds to the second primary color of sub-pixel, and the third primary color of pattern corresponds to the third primary color of sub-pixel.

Further, according to an embodiment of the present disclosure, the grating units comprise a first grating unit for outputting a first primary color of light, a second grating unit for outputting a second primary color of light, and a third grating unit for outputting a third primary color of light.

Further, in an optional embodiment, the first grating unit is used for emitting out a first primary color of light toward a viewing position, the second grating unit is used for emitting out a second primary color of light toward a viewing position, and the third grating unit is used for emitting out a third primary color of light toward a viewing position.

According to an embodiment of the present disclosure, there is further provided a display device. The display device comprises: a liquid crystal display panel as described in any of the above embodiments; and a collimated light source, wherein the collimated light source is disposed at a light entry side of the waveguide layer in the liquid crystal display panel, such as, on a side of the waveguide layer.

According to an embodiment of the present disclosure, there is further provided a driving method for a display device as described above. Specifically, the driving method comprises: scanning sub-pixels in the display device row by row; and inputting a first voltage or a second voltage to a plurality of pixel sub-electrodes respectively, according to a grayscale required by each sub-pixel unit, such that the sub-pixel unit displays based on the required grayscale.

BRIEF DESCRIPTION OF THE DRAWINGS

In order to illustrate the technical solutions in embodiments of the present disclosure more clearly, the appended drawings to be used in the embodiments will be introduced briefly in the following. Obviously, drawings in the following description are only some embodiments of the present disclosure. For those of ordinary skills in the art, other embodiments may also be obtained according to these drawings under the premise of not paying out creative work.

DETAILED DESCRIPTION OF THE EMBODIMENTS

In the following, the technical solutions in embodiments of the present disclosure will be described clearly and completely in connection with the drawings in embodiments of the present disclosure. Obviously, the described embodiments are just a part of embodiments of the present disclosure, and not all of them. Based on the embodiments described in the present disclosure, all the other embodiments obtained by those of ordinary skills in the art under the premise of not paying out creative work pertain to the scope protected by the disclosure.

In the drawings, the following reference signs are used to denote various components:
10 first substrate
100 pixel unit
101 first primary color of sub-pixel
102 second primary color of sub-pixel
103 third primary color of sub-pixel
20 second substrate
30 liquid crystal layer
31 pixel electrode layer
311 pixel sub-electrode
32 common electrode layer
33 alignment layer
40 waveguide grating
401 waveguide layer
402 grating layer
4021 first grating unit
4022 second grating unit
4023 third grating unit
411 grating sub-unit
50 color film layer
501 first primary color of pattern
502 second primary color of pattern
503 third primary color of pattern
60 collimated light source.

Figure 1:
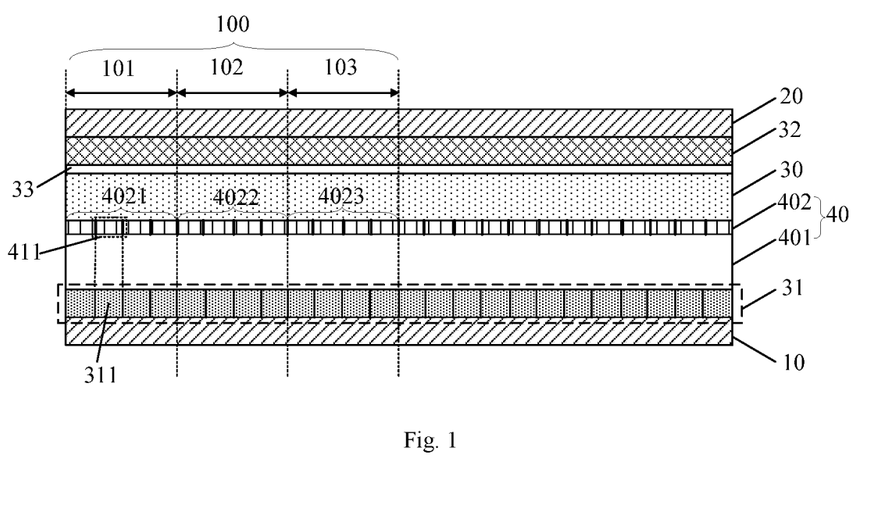
FIG. 1 is a structure diagram of a liquid crystal display panel according to an embodiment of the present disclosure.

An embodiment of the present disclosure provides a liquid crystal display panel. As shown in FIG. 1, the liquid crystal display panel comprises: a first substrate 10 and a second substrate 20 disposed opposite to each other; as well as a liquid crystal layer 30 and a pixel electrode layer 31 and a common electrode layer 32 for driving the liquid crystal layer 30 between the first substrate 10 and the second substrate 20. The liquid crystal display panel further comprises an array of pixel units, which is, in particular, divided into a plurality of pixel units 100, wherein each of the pixel units comprises a plurality of sub-pixel units. Optionally, each of the pixel units 100 comprises a first primary color of sub-pixel 101, a second primary color of sub-pixel 102 and a third primary color of sub-pixel 103, for example, a red sub-pixel, a green sub-pixel and a blue sub-pixel.

In addition, as shown in FIG. 1, the liquid crystal display panel further comprises a waveguide grating 40 located between the liquid crystal layer 30 and the first substrate 10. To be specific, the waveguide grating 40 comprises a waveguide layer 401, and a grating layer 402 located on a surface of the waveguide layer 401 facing the liquid crystal layer 30, wherein the grating layer 402 is in contact with the liquid crystal layer 30. In this way, when adjusting an electric signal applied to the pixel electrode layer 31 and the common electrode layer 32, the liquid crystal molecules in the liquid crystal layer 30 can be deflected, such that the refractive index of the liquid crystal layer 30 is changed. Hence, the refractive index of the liquid crystal layer 30 may be controlled. Further, the difference between the refractive index of the liquid crystal layer 30 and the refractive index of the grating layer 402, as well as the specific amount of this difference can be controlled.

In view of above, as shown in FIG. 1, the pixel electrode layer further comprises an array of pixel sub-electrodes 311 insulated from each other, wherein each sub-pixel unit corresponds to a plurality of pixel sub-electrodes 311. Additionally, the grating layer 402 further comprises an array of grating units, wherein each of the grating units comprises a plurality of grating sub-units, and each of the grating sub-units corresponds to a pixel sub-electrode. Optionally, the grating units comprise a first grating unit 4021 corresponding to the first primary color of sub-pixel 101, a second grating unit 4022 corresponding to the second primary color of sub-pixel 102, and a third grating unit 4023 corresponding to the third primary color of sub-pixel 103. In addition, the refractive index of each grating sub-unit is configured such that light is not allowed to be transmitted through a corresponding portion of liquid crystal when a first voltage is applied to a respective pixel sub-electrode, and light is allowed to be transmitted through a corresponding portion of liquid crystal with a predetermined grayscale when a second voltage is applied to a respective pixel sub-electrode, wherein the second voltage is different from the first voltage.

It should be noted that, the grating layer 402 located on a surface of the waveguide layer 401 facing the liquid crystal layer 30 may be a notch structure disposed on an upper surface of the waveguide layer 401. That is, the waveguide layer 401 and the grating layer 402 form an integral structure. Of course, the grating layer 402 located on a surface of the waveguide layer 401 facing the liquid crystal layer 30 may also be a structure independent of the waveguide layer 401, as long as it can be ensured that grating bars of the grating layer 402 and gaps between individual grating bars have different refractive indexes for light.

In addition, it should be also noted that, in the present disclosure, the liquid crystal layer 30 can be made of blue phase liquid crystal or nematic phase liquid crystal. Namely, a rod-shaped liquid crystal molecule structure may be chosen. When nematic phase liquid crystal is chosen, as shown in FIG. 1, generally, it is further necessary to dispose an alignment layer 33 on a side of the liquid crystal layer 30 closer to the second substrate 20, so as to ensure that molecules of the liquid crystal layer have an initial alignment. It should be noted that, all the following embodiments further illustrate the present disclosure by taking the nematic phase liquid crystal as an example.

Also, it should be noted that, the pixel electrode layer 31 and the common electrode layer 32 for driving the liquid crystal layer 30 may be located at both sides of the liquid crystal layer 30, as shown in FIG. 1. Of course, this may not be the case. Exemplarily, the pixel electrode layer 31 and the common electrode layer 32 for driving the liquid crystal layer 30 may also be located at the same side of the liquid crystal layer 30. Optionally, the pixel electrode layer 31 is a strip electrode, and the common electrode layer 32 is a surface electrode, wherein the pixel electrode layer 31 is closer to the liquid crystal layer 30 than the common electrode layer 32. Alternatively, the pixel electrode layer 31 and the common electrode layer 32 may also be strip electrodes disposed at intervals in the same layer. The present disclosure is not restricted in this regard, as long as it can be ensured that the liquid crystal molecules in the liquid crystal layer 30 are deflected because of being driven by the pixel electrode layer 31 and the common electrode layer 32, thereby adjusting the refractive index of the liquid crystal layer 30. It shall be noted that, all the following embodiments further illustrate the present disclosure by taking that the pixel electrode layer 31 and the common electrode layer 32 are located at two sides of the liquid crystal layer 30 as an example.

In addition, in the present disclosure, the thickness of the liquid crystal layer 30 is relatively low. Thus, the response speed at which the liquid crystal layer 30 is driven by the pixel electrode layer 31 and the common electrode layer 32 is relatively high, thereby being beneficial for display of a picture. Meanwhile, the grating layer 402 in the waveguide grating 40 may be made at nanoscale, thereby making it easy for the liquid crystal display panel to achieve a high resolution display of picture.

In summary, each sub-pixel corresponds to a plurality of pixel sub-electrodes insulated from each other, and the grating unit corresponding to the sub-pixel also comprises a plurality of grating sub-units, wherein each grating sub-unit is in one-to-one correspondence with a plurality of pixel sub-electrodes insulated from each other. Thus, for each sub-pixel, by controlling the strength of electric field between different pixel sub-electrodes and the common electrode layer, changes of the refractive index of the liquid crystal layer at positions corresponding to various pixel sub-electrodes can be adjusted. Thus, the transmittance of light emitted by grating sub-units corresponding to various pixel sub-electrodes through the liquid crystal layer at the position may be controlled by means of the difference in the refractive index of the liquid crystal layer, thereby achieving a grayscale display of sub-pixel.

In the following, a specific way in which the grayscale display of sub-pixel is achieved will be further illustrated.

For example, when the voltage applied to a pixel sub-electrode 311 corresponding to a grating sub-unit 411 is adjusted to be a first voltage (generally, a constant voltage is applied to the common electrode 32), the refractive index of the liquid crystal layer 30 is the same as that of the grating layer 402. At this point, what will appear above the waveguide layer 401 is a whole body of a uniform refractive index, comprising the grating layer 402 and the liquid crystal layer 30 having the same refractive index. Thus, no light will be emitted out from the waveguide layer 401 and transmitted through the grating layer 402 and the liquid crystal layer 30. On the other hand, when the voltage applied to a pixel sub-electrode 311 corresponding to a grating sub-unit 411 is adjusted to be a second voltage, the refractive index of the liquid crystal layer 30 is different from that of the grating layer 402. Thus, light can be emitted out from the grating sub-unit 411 and transmitted through the liquid crystal layer 30.

As such, by controlling that light can be transmitted through each grating sub-unit corresponding to a sub-pixel and further the liquid crystal layer, the number of grating sub-units that can transmit light may be controlled. Thus, different brightness of display, i.e., different grayscale display of the sub-pixel may be achieved.

As another example, when the voltage applied to a pixel sub-electrode 311 corresponding to a grating sub-unit 411 is adjusted to be the first voltage, the refractive index of the liquid crystal layer 30 is the same as that of the grating layer 402. In this case, no light will be emitted out from the waveguide layer 401 and transmitted through the grating layer 402 and the liquid crystal layer 30. On the contrary, the voltage applied to a pixel sub-electrode 311 corresponding to a grating sub-unit 411 is adjusted to be the second voltage, and the difference between the refractive index of the liquid crystal layer 30 and the refractive index of the grating layer 402 is made to be large. In this way, light will be emitted out from the grating sub-unit 411 and transmitted through the liquid crystal layer 30 with a high transmittance. Further, the voltage applied to a pixel sub-electrode 311 corresponding to a grating sub-unit 411 is adjusted to be between the first voltage and the second voltage, and the difference between the refractive index of the liquid crystal layer 30 and the refractive index of the grating layer 402 is adjusted. Thus, it may be possible to control the amount of light emitted out from the grating sub-unit 411 and transmitted through the liquid crystal layer 30, namely, the transmittance.

As such, in combination with the size of the difference between the refractive index of the liquid crystal layer and the refractive index of the grating layer, by controlling whether light can be emitted out from each grating sub-unit and transmitted through the liquid crystal layer, it may also be possible to control the transmittance with which light emitted out from each grating sub-unit passes through the liquid crystal layer. Thus, different brightness of display, i.e., different grayscale of display of the sub-pixel may be achieved.

In addition, for the above two modes of grayscale display, the plurality of grating sub-units 411 in each grating unit may be exactly the same, or may be also different. For example, the plurality of grating sub-units 411 in each grating unit may have different grating structures, such that the brightness or area of the exiting light for the plurality of grating sub-units 411 are different. The present disclosure is not restricted in this regard.

Further, for the different grating structures of the plurality of grating sub-units 411 in the grating unit, they may be selected specifically as one or more of the following: the duty cycle, the height of a grating bar in a direction perpendicular to the display panel, the cross-section shape of the grating bar in a plane parallel to the display panel, as well as the length and the width of a grating area in a direction parallel to the side of the display panel.

It should be noted that, for the plurality of grating sub-units 411 in the grating unit, only by setting one of the duty cycle, the height of a grating bar or the cross-section shape of the grating bar to be different, the brightness of the exiting light for the plurality of grating sub-units 411 is made to be different, ensuring that the amounts of the exiting light for the plurality of grating sub-units 411 are different. Of course, alternatively, only by setting one of the length of a grating area and the width of the grating area to be different, the areas of the exiting light for the plurality of grating sub-units 411 are different, ensuring that the amounts of the exiting light for the plurality of grating sub-units 411 are different. Clearly, it will be appreciated by the skilled in the art that it may be further possible to set at least two of the duty cycle, the height of a grating bar, the cross-section shape of the grating bar, the length of a grating area and the width of the grating area to be different, such that the amounts of the exiting light for the plurality of grating sub-units 411 are different.

In addition, the cross section of the grating bar is a section in a plane parallel to the display panel. In a specific embodiment, the cross section of the grating bar may be selected to have a shape of trapezoid, rectangle, semicircular arc, etc. Likewise, the cross section of the grating bar may be also selected to be a circular arc having different radians, such that the brightness of the exiting light for the plurality of grating sub-units 411 is different.

Meanwhile, for the length of the grating area and the width of the grating area, a grating area with different lengths and/or widths may be produced directly in the production process. Of course, alternatively, it may be also possible to produce a continuous grating structure in a whole layer directly at first, and then cover a black matrix pattern on the grating structure. In this case, that part covered by the black matrix makes no light be transmitted through, whereas the position not covered with the black matrix can guarantee that light will be transmitted through normally. As such, by designing shapes of the black matrix pattern, grating areas with different lengths and grating areas with different widths may be obtained. In view of above, according to an embodiment of the present disclosure, optionally, each grating unit comprises eight grating sub-units 411 corresponding to eight pixel sub-electrodes 311 respectively. Specifically, the refractive indexes of the eight grating sub-units 411 are configured respectively such that light is allowed to be transmitted through corresponding portions of liquid crystal with 1-level, 2-level, 4-level, 8-level, 16-level, 32-level, 64-level and 128-level grayscale when the second voltage is applied to respective pixel sub-electrodes 311.

Figure 2:
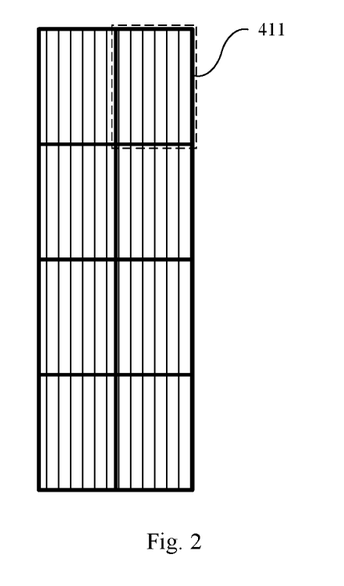
FIG. 2 is a schematic distribution diagram of grating sub-units in each grating unit of a liquid crystal display panel according to an embodiment of the present disclosure.

In a specific embodiment, the distribution of eight grating sub-units 411 which correspond to eight pixel sub-electrodes 311 respectively may be in the form of four rows and two columns, as shown in FIG. 2. Of course, the eight grating sub-units 411 may also be in the form of two rows and four columns, eight rows and one column, or one row and eight columns. In fact, a different suitable design may be selected according to actual needs, and the present disclosure is not restricted in this regard.

In view of above, according to an embodiment of the present disclosure, optionally, in a case where the first voltage and the second voltage are applied, the refractive index of the liquid crystal layer 30 may be represented as a first working refractive index N1 and a second working refractive index N2 respectively, wherein the first working refractive index N1 or the second working refractive index N2 is the same as the refractive index of the grating layer 402.

To be specific, when the first working refractive index N1 is the same as the refractive index of the grating layer 402, the second working refractive index N2 is different from the refractive index of the grating layer 402. That is, N1≠N2. In this case, when the refractive index of the liquid crystal layer 30 corresponding to a pixel sub-electrode 311 is the first working refractive index N1, light will be unable to be emitted out from a grating sub-unit 411 corresponding to the pixel sub-electrode 311 and transmitted through the liquid crystal layer 30. On the other hand, when the refractive index of the liquid crystal layer 30 is the second working refractive index N2, light will be able to be emitted out from a grating sub-unit 411 corresponding to the pixel sub-electrode 311 and transmitted through the liquid crystal layer 30 for normal display. As such, by driving the liquid crystal layer 30 corresponding to each pixel sub-electrode 311 to have the first working refractive index N1 or the second working refractive index N2, it can be controlled whether light can be emitted out from each grating sub-unit 411 in the grating unit and transmitted through the liquid crystal layer normally.

In the following, the principle of how the liquid crystal display panel achieves different grayscale of display will be further illustrated, wherein each grating unit comprises eight grating sub-units 411 corresponding to eight pixel sub-electrodes 311 respectively. Further, refractive indexes of the eight grating sub-units are configured respectively such that light is allowed to be transmitted through corresponding portions of liquid crystal with 1-level, 2-level, 4-level, 8-level, 16-level, 32-level, 64-level and 128-level grayscale when the second voltage is applied to respective pixel sub-electrodes.

Schematically, the eight grating sub-units 411 that allow light to be transmitted through with 1-level, 2-level, 4-level, 8-level, 16-level, 32-level, 64-level and 128-level grayscale are represented as a first grating sub-unit, a second grating sub-unit, a third grating sub-unit, a fourth grating sub-unit, a fifth grating sub-unit, a sixth grating sub-unit, a seventh grating sub-unit and an eighth grating sub-unit respectively. As such, when it is required to achieve display of 1-level (L1), 2-level (L2), 4-level (L4), 8-level (L8), 16-level (L16), 32-level (L32), 64-level (L64) or 128-level (L128) grayscale, it is only necessary to separately drive a pixel sub-electrode 311 corresponding to the first grating sub-unit, the second grating sub-unit, the third grating sub-unit, the fourth grating sub-unit, the fifth grating sub-unit, the sixth grating sub-unit, the seventh grating sub-unit or the eighth grating sub-unit, such that the refractive index of the corresponding liquid crystal layer 30 is the above-mentioned second refractive index N2, which may satisfy display of the above grayscale. Alternatively, when it is required to achieve display of 255-level (L255) grayscale, it may be possible to drive simultaneously pixel sub-electrodes 311 corresponding to the first grating sub-unit, the second grating sub-unit, the third grating sub-unit, the fourth grating sub-unit, the fifth grating sub-unit, the sixth grating sub-unit, the seventh grating sub-unit and the eighth grating sub-unit, such that the refractive index of the corresponding liquid crystal layer 30 is the above-mentioned second refractive index N2, which may satisfy display of the 255-level (1+2+4+8+16+32+64+128=255) grayscale. Further, alternatively, when it is required to achieve display of 20-level (L20) grayscale, it may be possible to drive simultaneously the third grating sub-unit (corresponding to the 4-level grayscale) and the fifth grating sub-unit (corresponding to the 16-level grayscale), such that the refractive index of the corresponding liquid crystal layer 30 is the above-mentioned second refractive index N2, which may satisfy display of the 20-level grayscale. Further, alternatively, when it is required to achieve display of 0-level (L0) grayscale, it may be possible to drive simultaneously pixel sub-electrodes 311 corresponding to the grating sub-units, such that the refractive index of the corresponding liquid crystal layer 30 is the above-mentioned first refractive index N1. In this way, it is ensured that light cannot be emitted out from various grating sub-units and transmitted through the liquid crystal layer 30, which may thus satisfy display of the 0-level grayscale. Likewise, by employing the above-described method, any of the 0~255-level grayscale may be displayed, which will not be repeated here any longer.

Of course, the above content is illustrated only by taking that the first working refractive index N1 is the same as the refractive index of the grating layer 402 and the second working refractive index N2 is different from the refractive index of the grating layer 402 as an example. Alternatively, for a case where the second working refractive index N2 is the same as the refractive index of the grating layer 402 and the first working refractive index N1 is different from the refractive index of the grating layer 402, a similar analysis will also apply, and the present disclosure will not repeat here any longer.

In addition, in other embodiments, each grating unit may further comprise nine grating sub-units 411 corresponding to nine pixel sub-electrodes 311 respectively, wherein refractive indexes of the nine grating sub-units are configured respectively such that light is allowed to be transmitted through corresponding portions of liquid crystal with 1-level, 2-level, 4-level, 8-level, 16-level, 32-level, 64-level, 128-level and 256-level grayscale when the second voltage is applied to respective pixel sub-electrodes. In this case, any of the 0~511-level grayscale can be displayed. The display principle for specific gray scales is the same as the above display principle of 0~255-level grayscale, and will not be repeated here any longer. Of course, the grating unit may also be further divided to satisfy finer grayscale adjustment.

Still further, to facilitate grayscale control and reduce energy consumption, in the present disclosure, optionally, the first working refractive index N1 or the second working refractive index N2 is the initial refractive index of the liquid crystal layer 30. In this case, the initial refractive index of the liquid crystal layer 30 is the refractive index of the liquid crystal layer 30 not been driven by the electric field between the pixel electrode layer 31 and the common electrode layer 32, namely, the refractive index of the liquid crystal layer 30 where no electric field is applied to the liquid crystal layer 30. This means that if the first working refractive index N1 is selected to be the initial refractive index, the first voltage is zero voltage. Similarly, if the second working refractive index N2 is selected to be the initial refractive index, the second voltage is zero voltage.

Specifically, taking that the first working refractive index N1 is the initial refractive index of the liquid crystal layer 30 as an example, the refractive index of the waveguide layer 401 may be selected as 2.0, and the refractive index of the grating layer 402 may be selected as 1.5. In this case, the initial refractive index of the liquid crystal layer 30 is the same as the refractive index of the grating layer 402 and is 1.5. That is, n1=1.5. The second working refractive index N2 of the liquid crystal layer 30, when it is driven by the electric field between the pixel electrode layer 31 and the common electrode layer 32, is equal to 1.8. As such, when light is required to be emitted out from a grating sub-unit 411 corresponding to a certain pixel sub-electrode 311 and normally transmitted through the liquid crystal layer 30, it suffices to apply an electric signal to the pixel sub-electrode 311 so as to drive the refractive index of the liquid crystal layer 30 at the position to be the second working refractive index N2.

Alternatively, when it is required that light cannot be transmitted through a grating sub-unit 411 corresponding to a certain pixel sub-electrode 311 and thus the liquid crystal layer 30, there is no need to apply an electric signal to the pixel sub-electrode 311, and the initial refractive index of the liquid crystal layer 30 is kept to be the same as the refractive index of the grating layer 402. Thus, light cannot be transmitted through the liquid crystal layer 30 at the corresponding position normally. Here, the description is made only by taking that the refractive index of the liquid crystal layer 30 is increased when it is driven by the electric field as an example. However, in an actual operation, a type of liquid crystal, of which the refractive index is decreased when it is driven by the electric field, may also be selected, and the present disclosure is not restricted in this regard.

Of course, the above content is illustrated only by taking that the initial refractive index is the same as the refractive index of the grating layer 402 as an example. In an actual operation, it may also be selected that the initial refractive index of the liquid crystal layer 30 is different from the refractive index of the grating layer 402. That is, the first working refractive index N1 is different from the refractive index of the grating layer 402, whereas the second working refractive index N2 is the same as the refractive index of the grating layer 402. That is to say, in a case where no electric field is applied, the refractive index of the liquid crystal layer 30 is different from the refractive index of the grating layer 402, whereas after being driven by applying an electric field, the refractive index of the liquid crystal layer 30 is the same as the refractive index of the grating layer 402.

The above examples are illustrated only by taking that the first working refractive index N1 is the initial refractive index of the liquid crystal layer 30 as an example. Of course, the case may also be such that the second working refractive index N2 is the initial refractive index of the liquid crystal layer 30. The wording principle in this case is the same as above, and will not be repeated here any longer.

Figure 3:
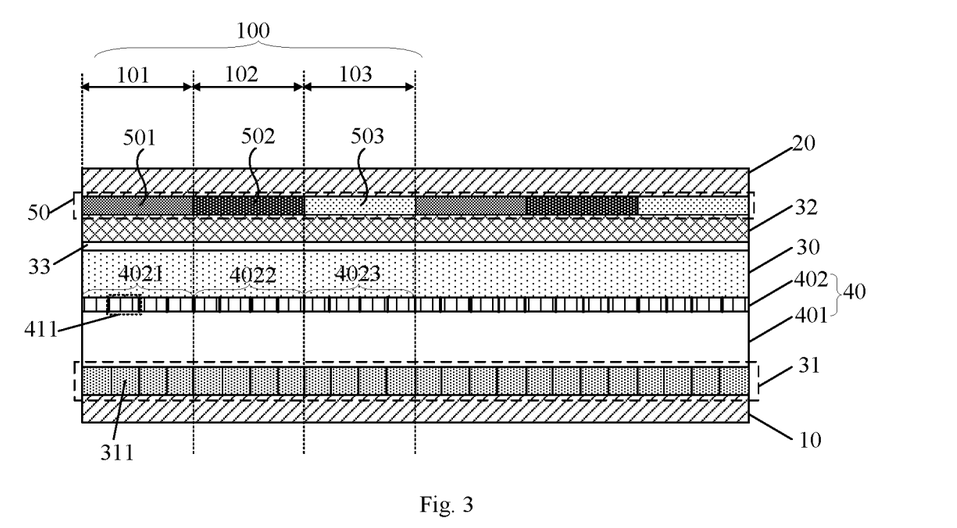
FIG. 3 is a structure diagram of a liquid crystal display panel according to another embodiment of the present disclosure.

In the following, it will be briefly described how the liquid crystal display panel in the present disclosure accomplishes color display, wherein the liquid crystal display panel is divided into a plurality of pixel units, and each of the pixel units comprises a first primary color of sub-pixel, a second primary color of sub-pixel and a third primary color of sub-pixel. As an example, for a case where light emitted from the first grating unit 4021, the second grating unit 4022 and the third grating unit 4023 is a mixed color of light, as shown in FIG. 3, it is further necessary for the liquid crystal display panel to have a color film layer 50 between the liquid crystal layer 30 and the second substrate 20. To be specific, the color film layer 50 comprises color film patterns, such as, a first primary color of pattern 501, a second primary color of pattern 502 and a third primary color of pattern 503. For example, the color film layer 50 comprises a red color film pattern, a green color film pattern and a blue color film pattern. In this case, the first primary color of pattern 501 corresponds to the first primary color of sub-pixel 101, the second primary color of pattern 502 corresponds to the second primary color of sub-pixel 102, and the third primary color of pattern 503 corresponds to the third primary color of sub-pixel 103.

As such, the mixed color of light emitted out by the first grating unit 4021 corresponding to the first primary color of sub-pixel 101 is changed into a first primary color of light after being transmitted through the first primary color of pattern 501; the mixed color of light emitted out by the second grating unit 4022 corresponding to the second primary color of sub-pixel 102 is changed into second primary color of light after being transmitted through the second primary color of pattern 502; and the mixed color of light emitted out by the third grating unit 4023 corresponding to the third primary color of sub-pixel 103 is changed into third primary color of light after being transmitted through the third primary color of pattern 503. In this way, different colors of display may be achieved.

As another example, for the waveguide grating, emission of light at a given wavelength in a given direction may be carried out by choosing the grating period. This means that for the first grating unit 4021, the second grating unit 4022 and the third grating unit 4023, emission of light with a given color in a given direction may be carried out by choosing the grating period, and the specific operation principle will be described in detail in the following. For light outputted from the waveguide grating, if light has a wavelength of λ, the angle θ between the light exiting direction of the outputted light and the normal of the panel plane meet a relationship of $2\pi/\lambda \cdot N_m = 2\pi/\lambda \cdot n_c \sin\theta + q2\pi/\Lambda$, wherein Λ is the grating period, $n_c$ is the refractive index of the dielectric layer above the waveguide, and both q and $N_m$ are known parameters. Thus, by choosing the grating period Λ, the grating unit can achieve emission of light at a given wavelength in a given direction.

As shown in FIG. 1, by choosing the grating periods A in the first grating unit 4021, the second grating unit 4022 and the third grating unit 4023, it can be possible to allow the first primary color of sub-pixel 101 to emit out the first primary color of light, the second primary color of sub-pixel 102 to emit out the second primary color of light, and the third primary color of sub-pixel 103 to emit out the third primary color of light. In the same time, it is not required to dispose a color film layer.

Here, it should be noted that FIG. 1 is illustrated by taking that the angle θ between the light exiting direction of the outputted light and the normal of the panel plane is 90° as an example. Of course, according to a specific embodiment, θ may also be set to other angle, for example, 60°. In such a case, the interlayer correspondence in individual sub-pixels is also a 60° tilt relationship.

Still further, to implement a near-eye display of light field, likewise, by choosing the grating periods A of the individual grating units, the first grating unit 4021 may be used for emitting out the first primary color of light toward the viewing position, the second grating unit 4022 may be used for emitting out the second primary color of light toward the viewing position, and the third grating unit 4023 may be used for emitting out the third primary color of light toward the viewing position.

Figure 4:
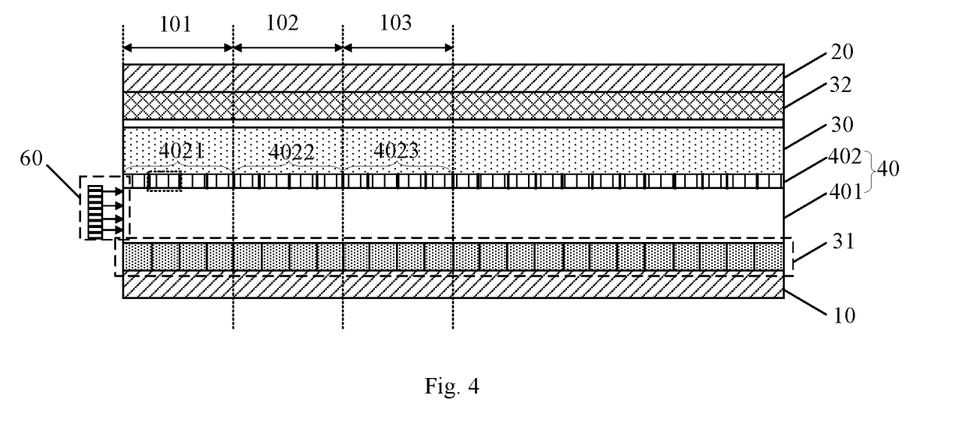
FIG. 4 is a structure diagram of a display device comprising a liquid crystal display panel according to an embodiment of the present disclosure.

An embodiment of the present disclosure further provides a display device. As shown in FIG. 4, the display device comprises: a liquid crystal display panel as described in any of the above embodiments; and a collimated light source 60, wherein the collimated light source 60 is located at a light entry side of the waveguide layer 401 in the liquid crystal display panel, such as, on a side of the waveguide layer 401. Such a display device has the same structure and beneficial effects as the liquid crystal display panel provided by the above described embodiments. Since the above described embodiments have already described the structure and beneficial effects of the liquid crystal display panel in detail, they will not be repeated here any longer.

It should be noted that, the above collimated light source 60 may be made of semiconductor laser chips of three colors, red, green and blue. Of course, the collimated light source 60 may also be made by light emitting diode (LED for short) chips of three colors, red, green and blue, after collimation and beam expansion. Alternatively, the collimated light source 60 may further be made by a white LED chip after collimation and beam expansion. Further, the collimated light source 60 may still be made by a strip-shaped cold cathode fluorescent lamp (CCFL for short) plus some light collimation structure. Of course, it will be appreciated by those skilled in the art that a non-collimated light source may also be used. In the present disclosure, a collimated light source is optionally employed to improve the light utilization.

Figure 5:
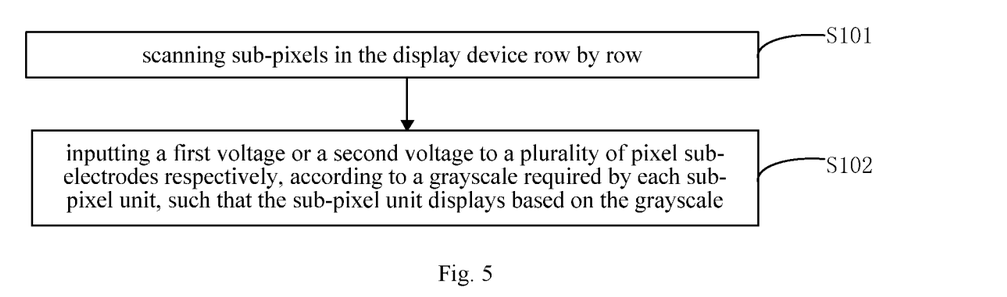
FIG. 5 is a flow diagram of a driving method for a display device according to an embodiment of the present disclosure.

An embodiment of the present disclosure further provides a driving method for a display device as described above. As shown in FIG. 5, the driving method comprises: step S101, scanning sub-pixels in the display device row by row; and step S102, inputting a first voltage or a second voltage to a plurality of pixel sub-electrodes respectively, according to the grayscale required by each sub-pixel unit, such that the sub-pixel unit conducts display based on the grayscale.

As such, for each sub-pixel, by controlling the strength of the electric field between different pixel sub-electrodes and the common electrode layer, the change of refractive index of the liquid crystal layer corresponding to various pixel sub-electrodes can be adjusted. Thus, the transmittance of light emitted out in a grating sub-unit corresponding to various pixel sub-electrodes through the liquid crystal layer at the position can be controlled by the difference of refractive index of the liquid crystal layer, thereby achieving display of the sub-pixel according to a preset grayscale.

Further, according to an embodiment of the present disclosure, in a case where the first voltage and the second voltage are applied, the refractive index of the liquid crystal layer 30 may be represented as a first working refractive index N1 and a second working refractive index N2 respectively, wherein the first working refractive index N1 or the second working refractive index N2 is the same as the refractive index of the grating layer 402. In this case, according to the grayscale required by each sub-pixel and the standard grayscale of various grating sub-units 411 in the sub-pixel, the first voltage or the second voltage may be inputted to various pixel sub-pixels 311 in the sub-pixel. By doing this, for the liquid crystal layer 30 corresponding to various pixel sub-electrodes 311, its refractive index is the first working refractive index N1 when driven by the first voltage, or its refractive index is the second working refractive index N2 when driven by the second voltage.

As such, by driving the refractive index of the liquid crystal layer 30 corresponding to each pixel sub-electrode 311 to be the first working refractive index N1 or the second working refractive index N2, it may be controlled whether light can be emitted out from each grating sub-unit 411 in the grating unit and transmitted through the liquid crystal layer normally, thereby achieving the normal display of each sub-pixel according to a preset grayscale.

The above descriptions are just specific embodiments of the present disclosure. However, the protection scope of the present disclosure is not limited thereto. Various variations or alternatives easily occurring to any artisan familiar with the technical field within the technical scope disclosed by the present disclosure should be encompassed within the protection scope of the present disclosure. Therefore, the protection scope of the present disclosure should be subject to the protection scope of the appended claims.

The invention claimed is:

1. A liquid crystal display panel, comprising an array of pixel units, wherein each pixel unit comprises a plurality of sub-pixel units, wherein the liquid crystal display panel further comprises:
   a first substrate and a second substrate opposite to each other;
   a liquid crystal layer as well as a pixel electrode layer and a common electrode layer for driving the liquid crystal layer between the first substrate and the second substrate; and
   a waveguide grating between the liquid crystal layer and the first substrate, wherein the waveguide grating comprises a waveguide layer and a grating layer on a surface of the waveguide layer facing the liquid crystal layer, and the grating layer is in contact with the liquid crystal layer; wherein
   the pixel electrode layer comprises an array of pixel sub-electrodes insulated from each other, wherein each sub-pixel unit corresponds to a plurality of pixel sub-electrodes;
   the grating layer comprises an array of grating units, wherein each grating unit comprises a plurality of grating sub-units, and each grating sub-unit corresponds to a pixel sub-electrode; and
   a refractive index of each grating sub-unit is configured for allowing no light to be transmitted through a corresponding portion of liquid crystal when a first voltage is applied to a respective pixel sub-electrode, and for allowing light to be transmitted through a corresponding portion of liquid crystal with a predetermined grayscale when a second voltage is applied to a respective pixel sub-electrode, wherein the second voltage is different from the first voltage.

2. The liquid crystal display panel according to claim 1, wherein
   the plurality of sub-pixel units comprise a first primary color of sub-pixel, a second primary color of sub-pixel, and a third primary color of sub-pixel; and
   the grating units comprise a first grating unit corresponding to the first primary color of sub-pixel, a second grating unit corresponding to the second primary color of sub-pixel, and a third grating unit corresponding to the third primary color of sub-pixel.

3. The liquid crystal display panel according to claim 1, wherein
   in each grating unit, the plurality of grating sub-units differ from each other at least in one or more of a duty cycle, a height of a grating bar in a direction perpendicular to the display panel, a cross-section shape of the grating bar in a plane parallel to the display panel, as well as a length and a width of a grating area in a direction parallel to a side of the display panel.

4. The liquid crystal display panel according to claim 1, wherein
   each grating unit comprises eight grating sub-units corresponding to eight pixel sub-electrodes respectively; and
   refractive indexes of the eight grating sub-units are configured respectively for allowing light to be transmitted through corresponding portions of liquid crystal with 1-level, 2-level, 4-level, 8-level, 16-level, 32-level, 64-level and 128-level grayscale when the second voltage is applied to respective pixel sub-electrodes.

5. The liquid crystal display panel according to claim 4, wherein
   the eight grating sub-units are arranged in a form of one row and eight columns, eight rows and one column, four rows and two columns, or two rows and four columns.

6. The liquid crystal display panel according to claim 1, wherein
   a refractive index of each grating sub-unit is configured to be identical to a refractive index of a corresponding portion of liquid crystal when the first voltage or the second voltage is applied to a respective pixel sub-electrode.

7. The liquid crystal display panel according to claim 6, wherein
   the first voltage or the second voltage is set to be zero voltage.

8. The liquid crystal display panel according to claim 1, wherein
   the liquid crystal display panel further comprises a color film layer between the liquid crystal layer and the second substrate, wherein the color film layer comprises an array of color film patterns, and each color film pattern corresponds to a sub-pixel unit.

9. The liquid crystal display panel according to claim 1, wherein
   the grating units comprise a first grating unit for outputting a first primary color of light, a second grating unit for outputting a second primary color of light, and a third grating unit for outputting a third primary color of light.

10. The liquid crystal display panel according to claim 9, wherein
    the first primary color of light, the second primary color of light and the third primary color of light are configured to be emitted out toward a viewing position.

11. A display device, comprising:
    a liquid crystal display panel according to claim 1; and
    a collimated light source located at a light entry side of the waveguide layer in the liquid crystal display panel.

12. A driving method for a display device according to claim 11, comprising:
    scanning sub-pixel units in the display device row by row; and
    inputting a first voltage or a second voltage to a plurality of pixel sub-electrodes respectively, according to a grayscale required by each sub-pixel unit, such that the sub-pixel unit displays based on the grayscale.

13. The display device according to claim 11, wherein
    the plurality of sub-pixel units comprise a first primary color of sub-pixel, a second primary color of sub-pixel, and a third primary color of sub-pixel; and
    the grating units comprise a first grating unit corresponding to the first primary color of sub-pixel, a second grating unit corresponding to the second primary color of sub-pixel, and a third grating unit corresponding to the third primary color of sub-pixel.

14. The display device according to claim 11, wherein in each grating unit, the plurality of grating sub-units differ from each other at least in one or more of a duty cycle, a height of a grating bar in a direction perpendicular to the display panel, a cross-section shape of the grating bar in a plane parallel to the display panel, as well as a length and a width of a grating area in a direction parallel to a side of the display panel.

15. The display device according to claim 11, wherein each grating unit comprises eight grating sub-units corresponding to eight pixel sub-electrodes respectively; and refractive indexes of the eight grating sub-units are configured respectively for allowing light to be transmitted through corresponding portions of liquid crystal with 1-level, 2-level, 4-level, 8-level, 16-level, 32-level, 64-level and 128-level grayscale when the second voltage is applied to respective pixel sub-electrodes.

16. The display device according to claim 15, wherein the eight grating sub-units are arranged in a form of one row and eight columns, eight rows and one column, four rows and two columns, or two rows and four columns.

17. The display device according to claim 11, wherein a refractive index of each grating sub-unit is configured to be identical to a refractive index of a corresponding portion of liquid crystal when the first voltage or the second voltage is applied to a respective pixel sub-electrode.

18. The display device according to claim 17, wherein the first voltage or the second voltage is set to be zero voltage.

19. The display device according to claim 11, wherein the liquid crystal display panel further comprises a color film layer between the liquid crystal layer and the second substrate, wherein the color film layer comprises an array of color film patterns, and each color film pattern corresponds to a sub-pixel unit.

20. The display device according to claim 11, wherein the grating units comprise a first grating unit for outputting a first primary color of light, a second grating unit for outputting a second primary color of light, and a third grating unit for outputting a third primary color of light.

* * * * *